(12) United States Patent
Lin

(10) Patent No.: US 7,722,037 B2
(45) Date of Patent: May 25, 2010

(54) SHEET MATERIAL CONVEYER SYSTEM WITH TENSION SUPPORT MEANS

(76) Inventor: Tzu-Che Lin, No. 16, Lane 358, Chu-Lin Road., Ching-Hu Village, Linkou Hsiang, Taipei Hsien (TW)

( * ) Notice: Subject to any disclaimer, the term of this patent is extended or adjusted under 35 U.S.C. 154(b) by 356 days.

(21) Appl. No.: 11/964,667

(22) Filed: Dec. 26, 2007

(65) Prior Publication Data

US 2009/0166967 A1 Jul. 2, 2009

(51) Int. Cl.
*B65H 5/02* (2006.01)
(52) U.S. Cl. ...................... 271/272; 271/275; 198/626.3
(58) Field of Classification Search .................. 271/272, 271/198, 275; 198/626.3, 626.4, 626.6, 813
See application file for complete search history.

(56) References Cited

U.S. PATENT DOCUMENTS 3,386,565 A * 6/1968 Carter ..................... 198/626.6
5,904,237 A * 5/1999 Sander et al. ............ 198/502.2
7,334,676 B1 * 2/2008 McGourin et al. ....... 198/626.6

\* cited by examiner

*Primary Examiner*—Patrick Mackey
*Assistant Examiner*—Michael C McCullough

(57) ABSTRACT

A sheet material conveyer system includes a sheet-transfer conveyer having an endless sheet-transfer belt for conveying sheet materials, a heater provided below the elevation of the endless sheet-transfer belt for heating the sheet materials being carried on the endless sheet-transfer belt to a dry state, an impression belt assembly having an endless impression belt disposed above the endless sheet-transfer belt for guiding movement of the sheet materials with the endless sheet-transfer belt, and tension supports insertable into a conveying space between the endless sheet-transfer belt and the endless impression belt from two opposite lateral sides to support the endless impression belt in shape and to control the tension of the endless impression belt.

5 Claims, 4 Drawing Sheets

SHEET MATERIAL CONVEYER SYSTEM WITH TENSION SUPPORT MEANS

BACKGROUND OF THE INVENTION

1. Field of the Invention

The present invention relates to a conveyer system for conveying sheet materials such as corrugated boards or the like, and more particularly to a sheet material conveyer system with tension support means.

2. Description of the Related Art

In a factory or plant, a conveyer system may be used to convey workpieces. A conveyer system generally comprises an endless conveying belt for conveying workpieces. A conveyer system for conveying sheet materials may be provided with a supplementary impression belt assembly adapted for holding workpieces on the endless conveying belt and guiding movement of the workpieces with the endless conveying belt. By means of the guiding of the supplementary impression belt assembly, the workpieces are prohibited from biasing or falling from the endless conveying belt during movement. However, a conventional conveyer system of this design is still not satisfactory in function because of the following drawbacks:

1. The supplementary impression belt assembly may become loosened easily after a long use, thereby narrowing the conveying space between the endless conveying belt and the supplementary impression belt assembly and affecting the conveying operation.

2. The conveying space between the endless conveying belt and the supplementary impression belt assembly may be not kept in a substantially uniform status, affecting conveying of sheet materials.

3. Because the supplementary impression belt assembly is loosening easily, the conveying space between the endless conveying belt and the supplementary impression belt assembly may be partially blocked during conveying of the sheet materials such as the bonded corrugated boards that are heated to a dry state by a heater in the conveyer system, affecting dissipation of vapor from the bonded corrugated boards.

SUMMARY OF THE INVENTION

The present invention has been accomplished under the circumstances in view. According to one aspect of the present invention, the sheet material conveyer system comprises a sheet-transfer conveyer having an endless sheet-transfer belt for conveying sheet materials, an impression belt assembly having an endless impression belt disposed above the endless sheet-transfer belt for guiding movement of the sheet materials with the endless sheet-transfer belt, and tension supports insertable into a conveying space between the endless sheet-transfer belt and the endless impression belt from two opposite lateral sides to support the endless impression belt in shape and to control the tension of the endless impression belt. According to another aspect of the present invention, the sheet-transfer conveyer comprises a heater provided below the elevation of the endless sheet-transfer belt for heating the sheet materials being carried on the endless sheet-transfer belt to a dry state. The use of the tension supports keeps the desired conveying space between the endless sheet-transfer belt and the endless impression belt for the passing of the sheet materials smoothly, allowing quick dissipation of vapor from the sheet materials as the sheet materials are being moved over the heater by the sheet-transfer conveyer and heated by the heater to a dry state.

DETAILED DESCRIPTION OF THE PREFERRED EMBODIMENT

Figure 1:
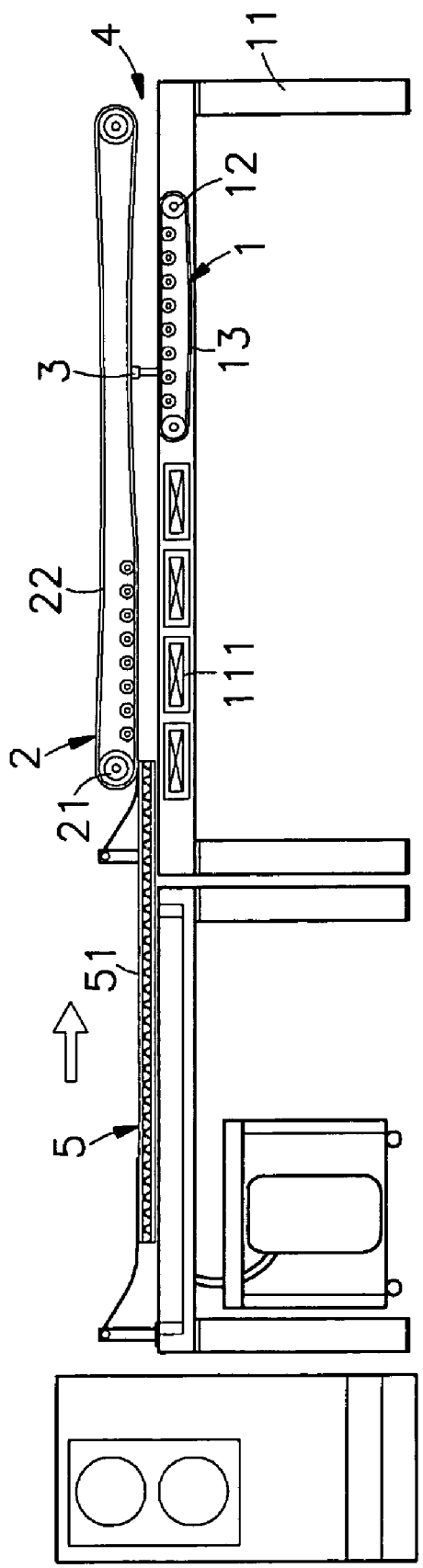
FIG. 1 is a schematic side view of a sheet material conveyer system in accordance with the present invention.
Figure 2:
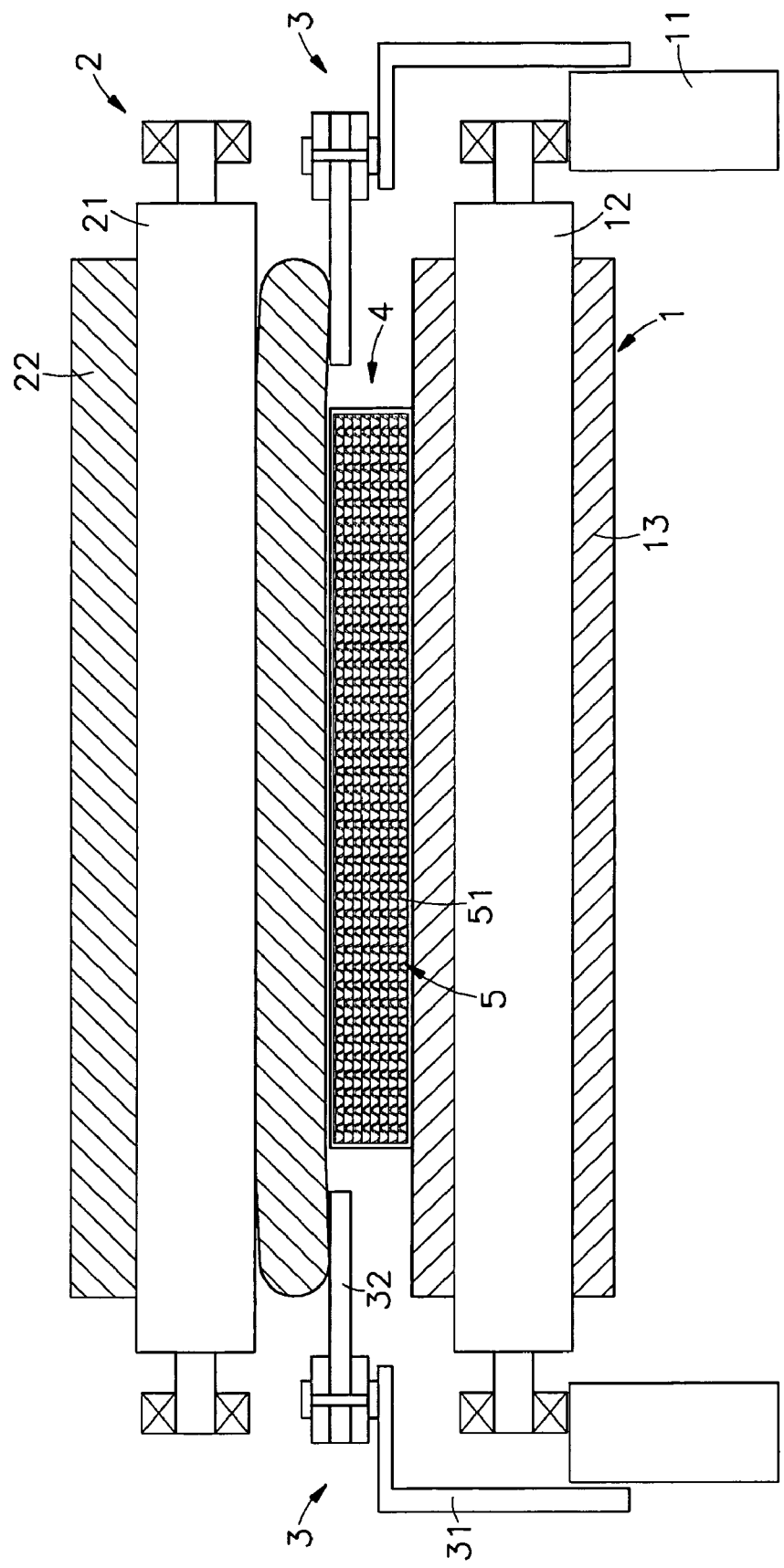
FIG. 2 is a sectional end view in an enlarged scale of the sheet material conveyer system in accordance with the present invention.
Figure 3:
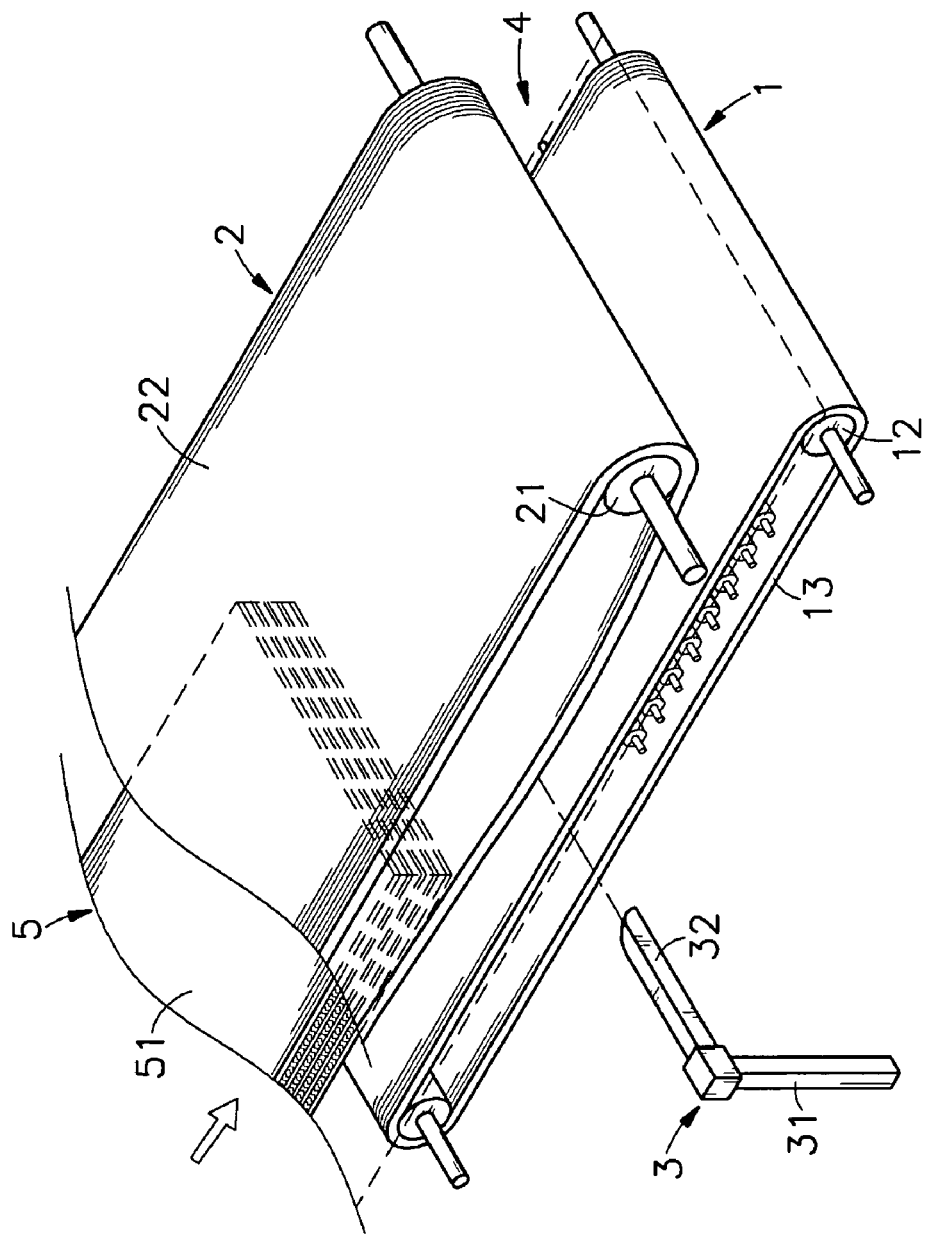
FIG. 3 is a perspective view in an enlarged scale of a part of the sheet material conveyer system in accordance with the present invention.

Referring to FIGS. 1~3, a sheet material conveyer system in accordance with the present invention is shown comprised of a sheet-transfer conveyer 1, an impression belt assembly 2 and a plurality of tension supports 3.

The sheet-transfer conveyer 1 comprises a rack 11, a heater 111 mounted in the rack 11, a driving shaft 12 rotatable to move an endless sheet-transfer belt 13, thereby conveying sheet materials 5, for example, corrugated boards 51 over the heater 111 that heat the corrugated boards 51 to a dry status.

The impression belt assembly 2 comprises a driving shaft 22 rotatable to move an endless impression belt 22.

The tension supports 3 each comprise an upright 31 and a supporting arm 32. According to this embodiment, the supporting arm 32 is a cantilever arm extended from the top end of the upright 31

The impression belt assembly 2 is provided above the sheet-transfer conveyer 1, defining with the endless sheet-transfer belt 13 of the sheet-transfer conveyer 1 a conveying space 4 for conveying the corrugated boards 51. When rotating the driving shaft 12 to move the endless sheet-transfer belt 13, the corrugated boards 51 is carried forwards by the endless sheet-transfer belt 13, and at the same time, the endless impression belt 22 is pressed on the corrugated boards 51 against the endless sheet-transfer belt 13 and rotated to guide movement of the corrugated boards 51 with the endless sheet-transfer belt 13 forwards. If the endless impression belt 22 is loosening after a long use due to the effect of gravitational force, the tension supports 3 are selectively set at two opposite lateral sides of the impression belt assembly 2 with the supporting arms 32 respectively inserted into the conveying space 4 to support the endless impression belt 22, controlling the tension of the endless impression belt 22 for guiding movement of the corrugated boards 51 with the endless sheet-transfer belt 13 smoothly forwards.

Figure 4:
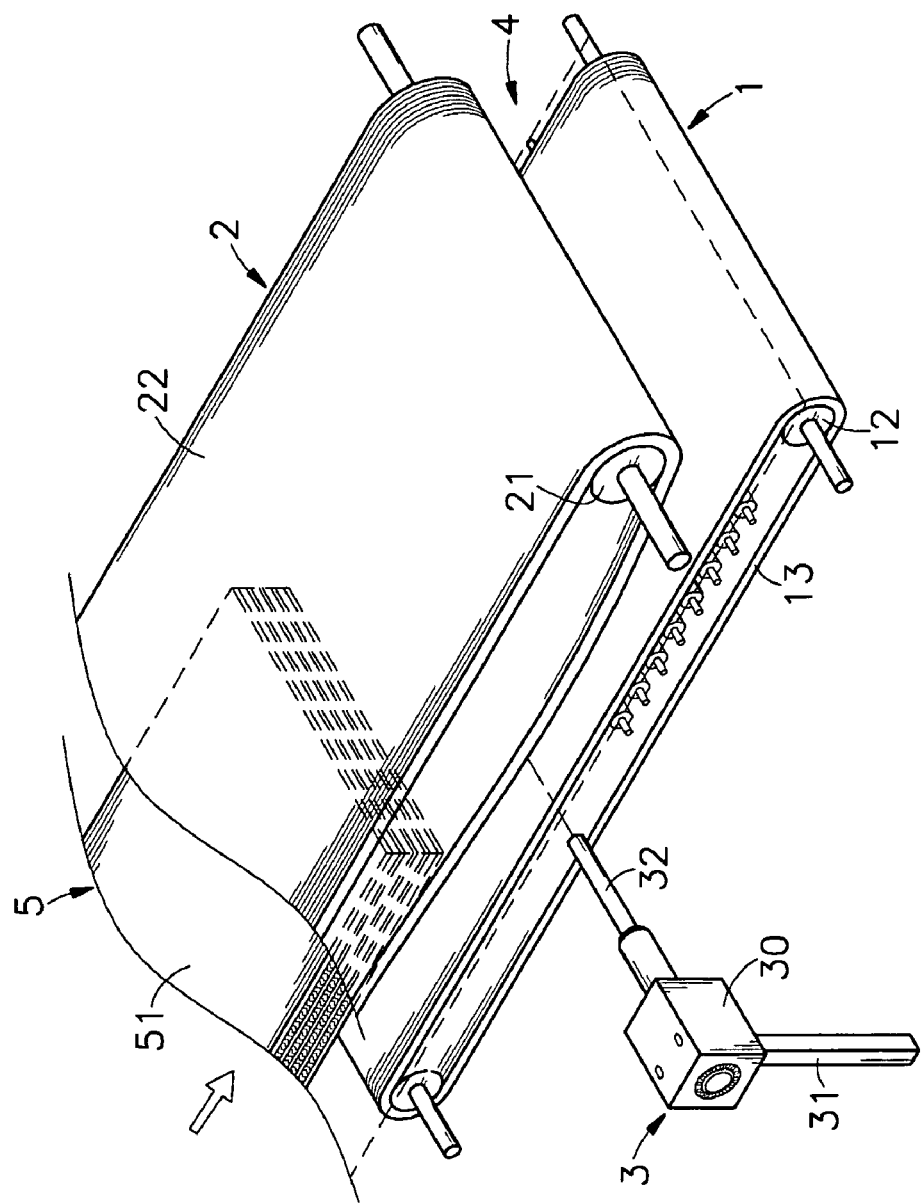
FIG. 4 corresponds to FIG. 3 but showing an alternate form of the tension support.

FIG. 4 illustrates an alternate form of the present invention. According to this embodiment, the supporting arm 32 of each tension support 3 is a rotation rod rotatable by a motor 30 that is provided at the top side of the upright 31.

Referring to FIGS. 1~4 again, during fabrication of the corrugated boards 51, a bonding glue is applied to the sheet materials 5 and then the sheet materials 5 are bonded into the corrugated boards 51, and then the corrugated boards 51 are carried on the sheet-transfer conveyer 1 and delivered through the conveying space 4 over the heater 111 that heats the corrugated boards 51 to a dry state. Because the conveying space 4 is an open space defined between the endless sheet-transfer belt 13 and the endless impression belt 22 and the heater 111 is mounted in the rack 11 below the conveying space 4, vapor that is produced during hardening of the bonding glue in the corrugated boards 51 due to the effect of the thermal energy from the heater 111 is quickly dissipated into the outside open air.

As stated above, the sheet material conveyer system of the present invention uses the sheet-transfer conveyer 1 and the impression belt assembly 2 to convey sheet materials 5, and the tension supports 3 to support the endless impression belt 22 of the impression belt assembly 2, controlling the tension of the endless impression belt 22.

In actual practice, the sheet material conveyer system of the present invention has the advantages and features as follows:

1. Tension supports 3 are selectively set at two opposite lateral sides of the impression belt assembly 2 with the supporting arms 32 respectively inserted into the conveying space 4 to support the endless impression belt 22 of the impression belt assembly 2, keeping the endless impression belt 22 at the desired tension for guiding movement of the corrugated boards 51 with the endless sheet-transfer belt 13 smoothly forwards.

2. The use of the tension supports 3 keeps the desired conveying space 4 for the passing of the corrugated boards 51 smoothly, allowing quick dissipation of vapor from the corrugated boards 51 as the corrugated boards 51 are being moved over the heater 111 and heated by the heater 111 to a dry state.

Although particular embodiments of the invention have been described in detail for purposes of illustration, various modifications and enhancements may be made without departing from the spirit and scope of the invention.

What the invention claimed is:

1. A sheet material conveyer system comprising:
   a sheet-transfer conveyer for conveying sheet materials, said sheet-transfer conveyer comprising a rack, an endless sheet-transfer belt supported on said rack and rotatable to convey said sheet materials, a driving shaft rotatable to move said endless sheet-transfer belt, and a heater mounted in said rack below the elevation of said endless sheet-transfer belt and adapted for heating said sheet materials being carrying on said endless sheet-transfer belt to a dry status;
   an impression belt assembly mounted on said rack above said endless sheet-transfer belt, said impression belt assembly comprising an endless impression belt spaced above said endless sheet-transfer belt for guiding movement of said sheet materials with said endless sheet-transfer belt, a driving shaft rotatable to move said endless impression belt; and
   a plurality of tension supports insertable into a conveying space between said endless sheet-transfer belt and said endless impression belt from two opposite lateral sides to support said endless impression belt in shape and to control the tension of said endless impression belt.

2. The sheet material conveyer system as claimed in claim 1, wherein each tension support of said plurality of tension supports comprises comprise an upright and a cantilever arm extended from a top side of said upright and insertable into said conveying space between said endless sheet-transfer belt and said endless impression belt to support said endless impression belt in shape.

3. The sheet material conveyer system as claimed in claim 1, wherein each tension support of said plurality of tension supports comprises comprise an upright and a round rod extended from a top side of said upright and insertable into said conveying space between said endless sheet-transfer belt and said endless impression belt to support said endless impression belt in shape.

4. The sheet material conveyer system as claimed in claim 1, wherein each tension support of said plurality of tension supports comprises comprise an upright and a rotating rod extended from a top side of said upright and rotatable relative to said upright and insertable into said conveying space between said endless sheet-transfer belt and said endless impression belt to support said endless impression belt in shape.

5. The sheet material conveyer system as claimed in claim 1, wherein each tension support of said plurality of tension supports comprises comprise an upright, a rotating rod extended from a top side of said upright and rotatable relative to said upright and insertable into said conveying space between said endless sheet-transfer belt and said endless impression belt to support said endless impression belt in shape, and a motor adapted for rotating said rotating rod.

* * * * *